(No Model.)

F. H. RICHARDS.
WEIGHING MACHINE.

No. 578,164. Patented Mar. 2, 1897.

Fig.1.

Witnesses:
Chas. D. King.
Fred. J. Dole.

Inventor:
F. H. Richards.

(No Model.)  5 Sheets—Sheet 2.

F. H. RICHARDS.
WEIGHING MACHINE.

No. 578,164.  Patented Mar. 2, 1897.

*Fig. 2.*

Witnesses:
Chas. D. King.
Fred. J. Dole.

Inventor:
F. H. Richards.

(No Model.) 5 Sheets—Sheet 3.
F. H. RICHARDS.
WEIGHING MACHINE.

No. 578,164. Patented Mar. 2, 1897.

Fig. 3.

Witnesses:
Chas. D. King.
Fred. J. Dole.

Inventor:
F. H. Richards.

(No Model.)  
5 Sheets—Sheet 4.

F. H. RICHARDS.
WEIGHING MACHINE.

No. 578,164. Patented Mar. 2, 1897.

Fig. 4.

Witnesses:
Chas. D. King.
Fred. J. Dole.

Inventor:
F. H. Richards.

(No Model.)

F. H. RICHARDS.
WEIGHING MACHINE.

No. 578,164.

Patented Mar. 2, 1897.

Witnesses:
Chas. D. King.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 578,164, dated March 2, 1897.

Application filed September 30, 1896. Serial No. 607,399. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing apparatus for automatically weighing and delivering various classes of free-flowing materials.

With respect to one of its objects the invention comprehends the provision of weighing mechanism embodying a load-receiver, main supply means for said load-receiver, and means for directing a continuously-running drip-stream to said load-receiver; and in the construction herein illustrated I employ two independently-operating weighing mechanisms, each having a load-receiver, to which latter said drip-stream is alternately directed, whereby the capacity of the apparatus is multiplied and the output largely increased.

Another object of the invention, the aim of which is to also secure great rapidity and precision, is to furnish, in connection with two load-receivers, a pair of meters or rough weighers located above and controlled by the weighing mechanisms, said meters being adapted to deliver alternately or discharge bodily or in bulk their respective charges or rough loads into the two load-receivers, the complement or remainder of the load being preferably furnished by the continuously-running drip-stream to which I have alluded.
In the drawings accompanying and forming part of this specification,
Figs. 3 and 4 are similar views showing the apparatus at two subsequent stages in its operation.
Figs. 5, 6, and 7 are detail views of the drip-supply mechanism in three positions occupied thereby during the weighing of loads in the two load-receivers,
and Figs. 8 and 9 are detail views hereinafter referred to.

Similar characters designate like parts in all the figures of the drawings.

The framework for supporting the various parts of the apparatus may be of any suitable character, and in the form shown herein consists of the base or bed 3, from which rise the columns or standards 2 and 4, connected at the top by the beam 5.

A duplex supply chute or hopper is illustrated at H, it being preferably formed integral with the beam 5 and having the two branches or spouts 6 and 7 for delivering supplies of material, respectively, to the two weighing mechanisms, which, however, are weighed out before being delivered to the load-receivers by interposed meters or rough weighers, as will hereinafter appear.

The invention includes as a part thereof, in the form herein illustrated, two independently-operative weighing mechanisms, (designated, respectively, by W and W'.) Said weighing mechanisms being the same in construction and mode of operation, it is deemed necessary to describe but one of them in detail—for example, the mechanism W—corresponding parts in the mechanism W' being designated by the same characters with prime-marks.

The weighing mechanism includes load-receivers or buckets (designated by G and G') and beam mechanism for sustaining the same, and said beam mechanism in the present instance consists of the counterweighted scale-beams 8 and 8' and 9 and 9', the latter being located above the former. The two beams will be fulcrumed on the framework and will be also provided with suitable supports for the bucket.

The buckets G and G' will each have the usual discharge-outlet, which is controlled by the counterweighted closer L or L'.

Figure 2:
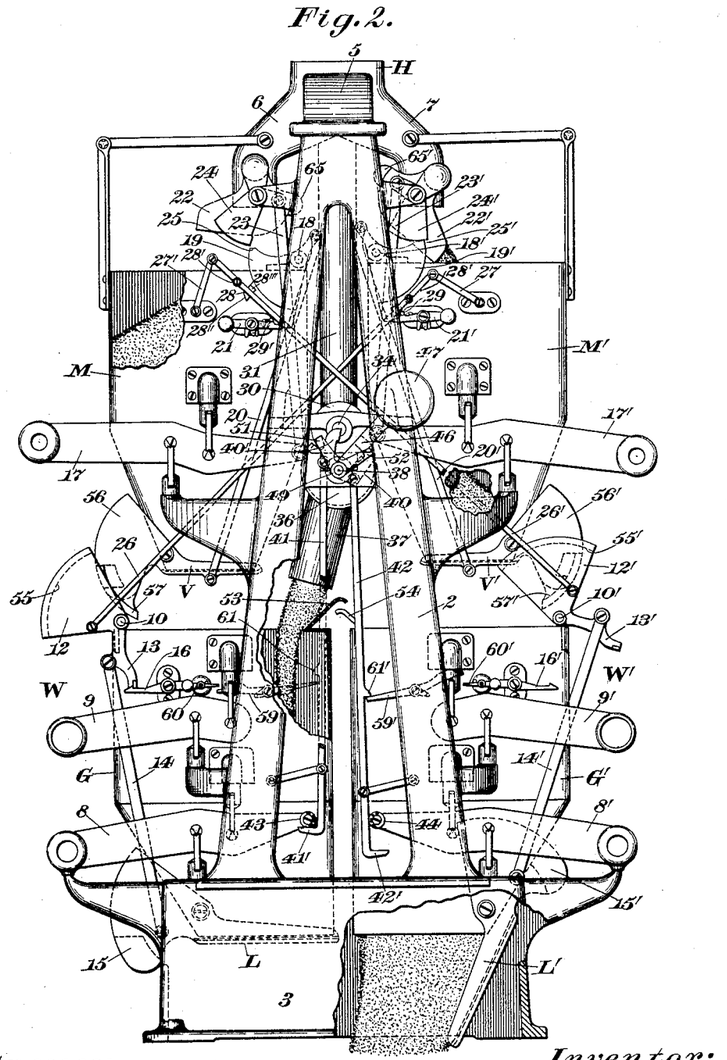
Fig. 2 is an end elevation as seen from the left in Fig. 1, the respective parts being in positions corresponding therewith.

For maintaining the closer in its normal or shut position the following instrumentalities may be employed: The bucket G at the upper rearward side thereof is furnished with brackets for supporting the rock-shaft 10, to which is rigidly secured the rocker 12 in the form of a segmental plate, said rocker having an integral arm 13, to a lug or ear on which is pivoted the connecting-rod 14, said rod being similarly attached at its lower end to the counterweighted plate 15 of the closer L. The rocker-arm 13 is adapted, when the closer is in its normal or shut position, to be engaged by a latch, said latch being shown at 16, pivotally mounted on the bucket and having a hook adapted to engage a shoulder or lug on the rocker-arm 13, as indicated in Fig. 2.

I employ as a part of my present invention two alternately-effective meters or rough weighers (designated, respectively, by M and M') located over the weighing mechanism W and W'. The two meters, which are in the form of buckets or receptacles, discharge their rough charges or loads into the two weighing mechanisms to form the major part of the loads to be made up thereby, the remainder of the loads being supplied by a continuously-running drip-stream, which is alternately directed to the two load-receivers. The meter mechanisms being the same in each case, but one of them will be specifically described, corresponding parts in the other being indicated by the same characters with a prime-mark.

Figure 3:
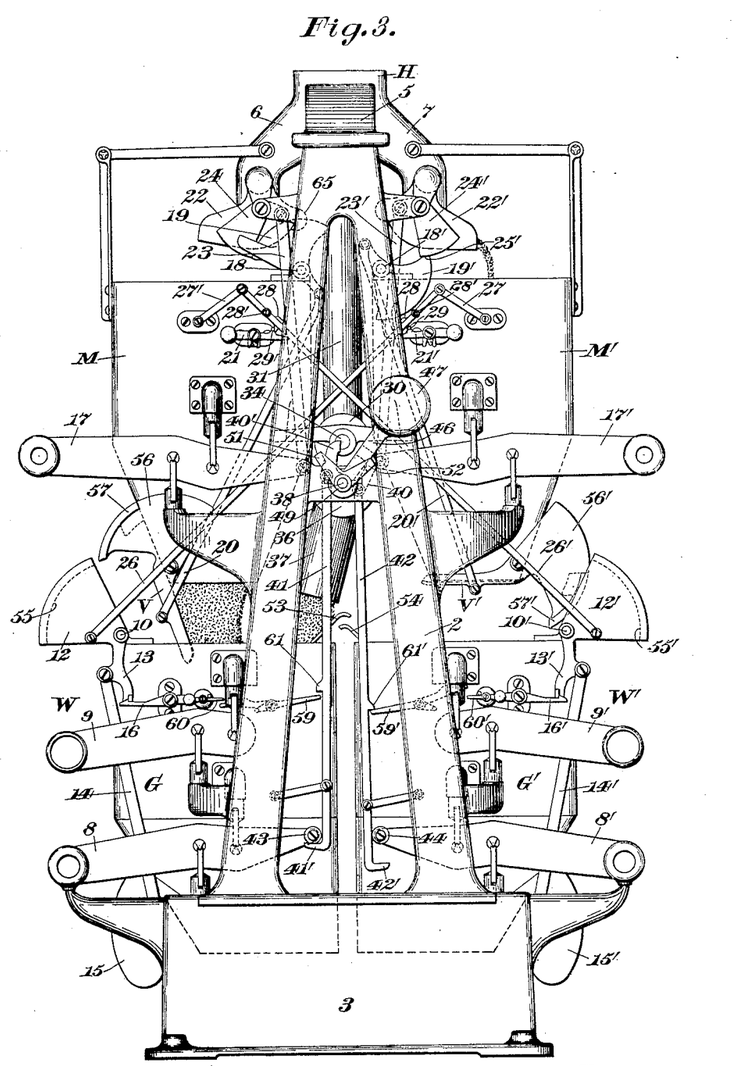

The meter or bucket M is supported by the counterweighted scale-beam 17, which is pivotally mounted on brackets extending from the framing of the machine, and said meter or bucket has a discharge-outlet which is controlled by the closer-valve V, which, when opened, as indicated in Fig. 3, will permit the contents of said meter to pass into the true-weighing bucket G. For keeping the closer-valve V in its shut position, as illustrated in Fig. 2, the following means may be employed: The meter-bucket M supports, near the upper inner side thereof, the rock-shaft 18, to which is connected a segmental rocker 19, said rocker having attached thereto the rod 20, which is pivoted to the closer-valve V about midway thereof.

It will be evident that when the rocker 19 is engaged by a suitable detent device the closer-valve V will be held against opening movement. Such a device for this purpose is illustrated as a counterweighted latch 21, pivotally mounted on the bucket and adapted to engage an arm on the rocker 19 when the closer-valve is shut, said latch swinging upward for this purpose.

The meters or buckets M and M' are located beneath the two spouts or branches 6 and 7 of the chute or hopper, which spouts are adapted to deliver streams of material into the respective buckets, and for controlling such streams I employ valves of the "oscillatory" type, (designated, respectively, by 22 and 22',) which are the same in construction and method of operation.

Figure 1:
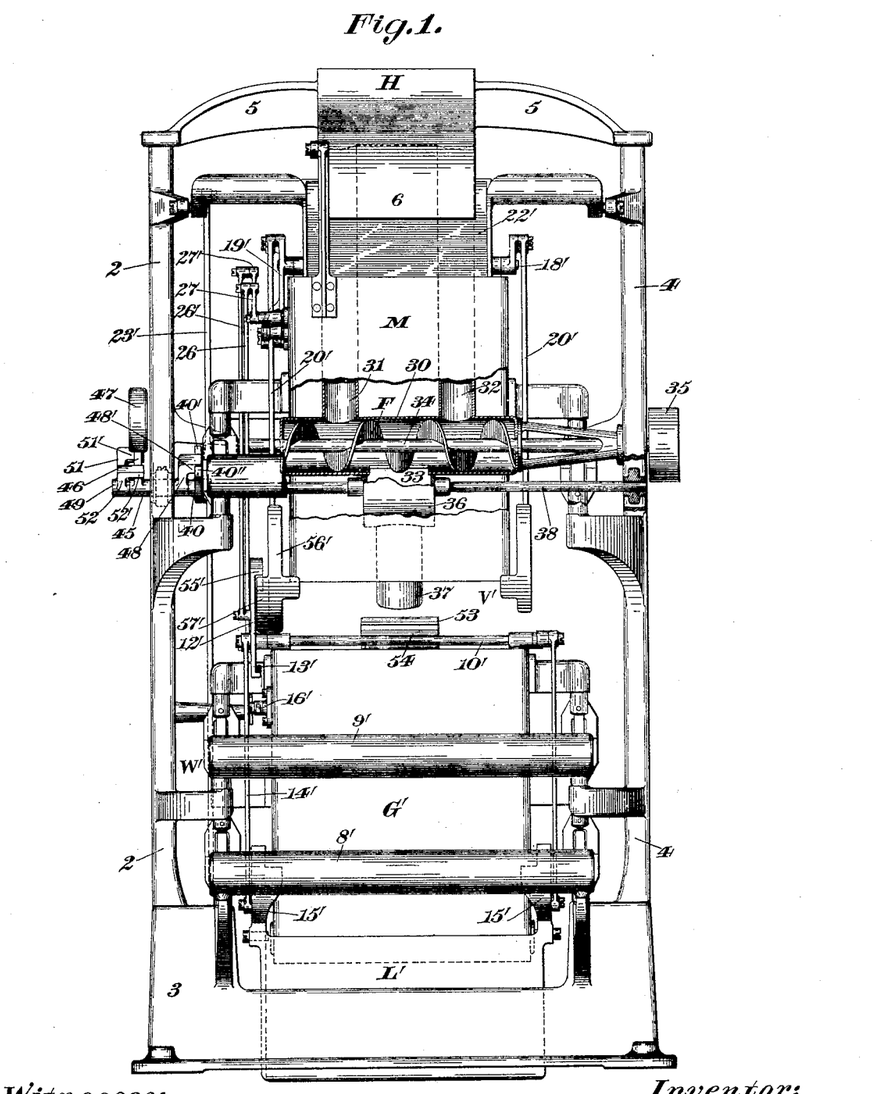
Figure 1 is a front elevation of a weighing apparatus embodying my present improvements, portions being broken away to illustrate more clearly certain peculiar features of the invention.

The valve 22 is pivotally supported between arms projecting laterally from the framing, as shown in Fig. 1. For closing said valve any suitable means may be employed—for example, the counterweight 65. For opening said valve the following instrumentalities may be employed: A thrust-rod is illustrated at 23, jointed to the valve 22 at the rear of its axis of movement, the free end of said rod resting on an arm of the beam 17. As the beam 17 descends with the bucket M during the making of a load it of course moves away from the rod 23, and in so doing the closure of the valve 22 will be effected by the weight 65. As said beam rises it will transmit an upward thrust to the rod 23, which is communicated to the valve for forcing the same open.

Reciprocally-effective stops are illustrated, operative, respectively, with the stream-controlling valve 22 and with the closer-valve V, the rocker 19, to which reference has been previously made, constituting one of said stops, the coacting stop being designated by 24 and being, like the rocker 19, segmental. The action of these stops will be apparent from an inspection of Figs. 4 and 3, the valve 22 being in its wide-open position in the first-mentioned view and the closer-valve shut, the plane face 25 of the rocking stop 19 being contiguous to the curved face of the stop-segment 24, so that should the latch 21 be prematurely tripped the oscillation of the rocking stop 19 will be blocked by its mate and the closer-valve V consequently maintained in its normal position, and until the valve 22 has reached the end of its cut-off stroke, as illustrated in Fig. 3, at which time the rocking stop 19 is free to oscillate, provided, of course, the latch 21 has been tripped, and in so doing its curved face will ride in contact with the stop-segment 24, whereby retractive movement of the latter will be arrested, the valve 22 being maintained shut.

Figures 5, 6, 8:
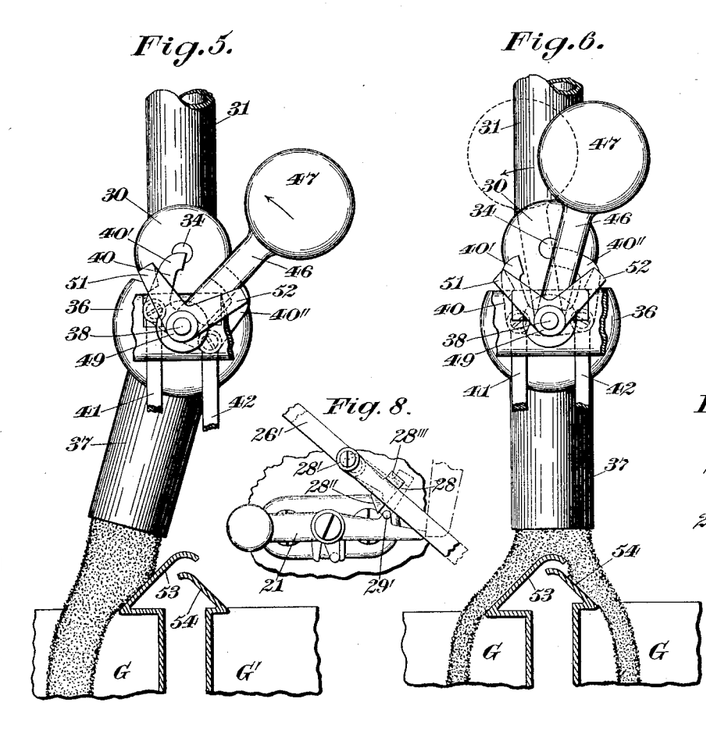
Figures 7, 9:
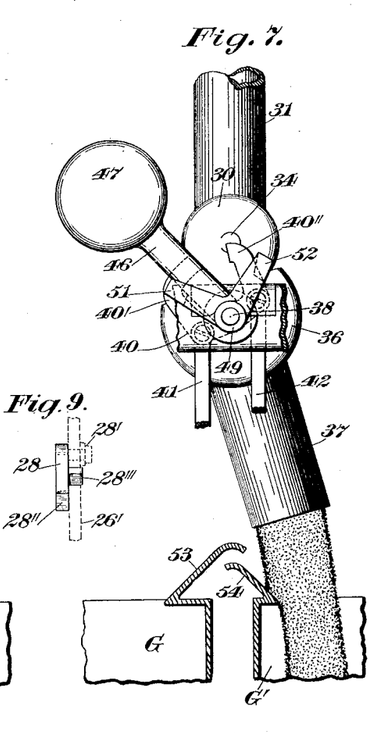

For effecting the discharge of the load from the meter M' means operative with the weighing mechanism W are employed, and for accomplishing the same result with the meter M means connected with the weighing mechanism W' are utilized, whereby the simultaneous discharge of the load-receivers G and G' will be prevented, a suitable tripper, connected to and operative with the weighing mechanisms W and W', being effective for tripping the latches 21' and 21. A relatively long rod is shown at 26, pivoted, respectively, to the rocker 12 and to an arm 27, which is oscillatory on the meter-bucket M', said rod carrying at a suitable point thereon a by-pass dog 28, which is normally located below the pin 29 on the latch 21'. This by-pass dog is pivoted to the rod at 28' and is provided with a beveled face 28" and with a right-angular flange 28''', as shown in Figs. 8 and 9, the same characters being employed to designate said dog and its connection on both of the rods 26 and 26'.

It will be assumed that the latch 16 has been tripped, in which case the closer L will be released. As the closer L opens an upward thrust will be transmitted to the rod 14, the rocker 12, and the reciprocal rod 26, and when the by-pass dog 28 meets the pin 29 on the latch 21' it will yield laterally, so that said dog will pass by said pin. As the closer L returns to its normal or shut position an opposite stroke will be imparted to the rod 26, so that the by-pass dog 28 will be carried into engagement with the pin 29 and will thereby depress the latch 21', and continuing its movement said by-pass dog will ride off said pin, at which time the closer L will have reached its normal position. By the depression of the latch 21' the closer-valve V' will be released and will be forced open, so that the contents of the meter M' may be discharged into the true-weighing bucket G'. The same operation takes place with respect to the latch 21, which is tripped by similar means connected to the rocker 12'.

Suitable means will be employed for maintaining a continuously running or flowing drip-stream of proper volume, instrumentalities being employed for alternately directing or switching such drip-stream to the load-receivers of the weighing mechanisms, and the organization herein illustrated for accomplishing these results will now be described. A long cylindrical casing or shell is shown at 30, suitably supported between the end frames or columns 2 and 4, with which casing are connected the two supply conduits or pipes 31 and 32 near opposite ends thereof, said pipes communicating with the duplex chute or hopper H for continuously supplying said casing with material, the latter having an outlet 33, from which the mass may pass into an oscillatory or swinging drip-supply spout 37, disposed below said outlet.

For the purpose of obtaining a more even and uniform drip-supply I prefer to employ a force-feed device or power-driven feeder, (shown as of the "screw" type,) such feeder being designated by F and being rotative within the casing 30.

The shaft 34 of the feeder or conveyer screw F is journaled in the end walls of the casing and projects beyond one of said walls and is supported by the upright 4, said shaft carrying at its outer end a pulley 35, which may be connected by belting with a suitable motor, (not shown,) or said feeder may be otherwise operated.

The feeder F consists of a shaft and two feeder or conveyer screw sections oppositely disposed thereon, whereby said sections on the rotation of the shaft are adapted to feed supplies of material from opposite directions as they are received from the two pipes 31 and 32, toward the outlet 33, from whence they pass into the oscillatory drip-supply device 37.

The drip-supply device is in the form of a swinging spout comprising a concaved body portion or pocket 36, having the spout proper or cylindrical tube 37, said spout being joined to the two-part shaft 38, which is supported for rocking movement between the end frames 2 and 4.

The drip-spout will have oscillatory movements of differential ratio, the initial movement being a comparatively slow one and the final movement being accelerated or multiplied, so that said spout, during the primary stage of its operation, may deliver a drip-stream of progressively-decreasing volume to the bucket, into which the metered charge, which constitutes the main supply, has already been discharged, whereby the load may be poised with accuracy. On the completion of the load the oscillatory spout will have its final or accelerated movement for rapidly switching the drip-stream from the bucket, said stream in the present case being delivered to the other weighing-bucket and the spout being automatically controlled by the weighing mechanism or mechanisms.

In the construction herein illustrated the primary movement of the spout will be effected by means operative with the weighing mechanism, the final movement thereof being secured by independent or extraneous instrumentalities, and the organization of devices for obtaining these results will now be set forth. A yoke is shown at 40, fast on the shaft 38, it having the depending rods 41 and 42 pivoted thereto, said rods being furnished with hooks or stirrups 41' 42' at the lower or free ends adapted to be successively or alternately engaged and operated by suitable projections, such as the antifriction-rolls 43 and 44, on the two beams 8 and 8', respectively. A sleeve is illustrated at 45, it having a projecting arm 46, which is provided with a spout-operating weight 47 of proper efficiency, said sleeve being loose on the shaft 38 and having a shouldered arm 48, the shoulder or offset 48' of which is adapted to be engaged alternately by the two arms 40' and 40'' of the yoke 40. A second sleeve is shown at 49, it being rigid or fast on the shaft 38 and having the shouldered arms 51 and 52, between the shoulders 51' and 52' of which the counterweighted arm 46 is oscillatory.

The operation of mechanism just described will be clearly apparent from an inspection of the drawings and will now be briefly set forth. Fig. 2 represents the bucket G as having discharged a weighed load, the said bucket being almost empty, the closer L of course being latched shut, and the spout 37 delivering a small stream of material into said bucket G, and the projection 43 on the beam 8 being in engagement with the hook or stirrup 41' on the rod 41. On the discharge of the load by the bucket G the closer L' will shut, and in so doing the rod 26', by reason of its connections with said closer, will be drawn downward until the dog meets the pin 29' on the latch 21, whereby on the continuation of the movement of said rod the latch 21 will be tripped and the closer-valve V released and forced open by weight of the measured charge in the meter-bucket M, such charge being delivered bodily into the weighing-bucket G, as illustrated in Fig. 3.

Referring to Fig. 1, the arm 40'' of the yoke 40 is contiguous to the shoulder or offset 48' of the arm 48 on the loose sleeve 45.

Figure 4:
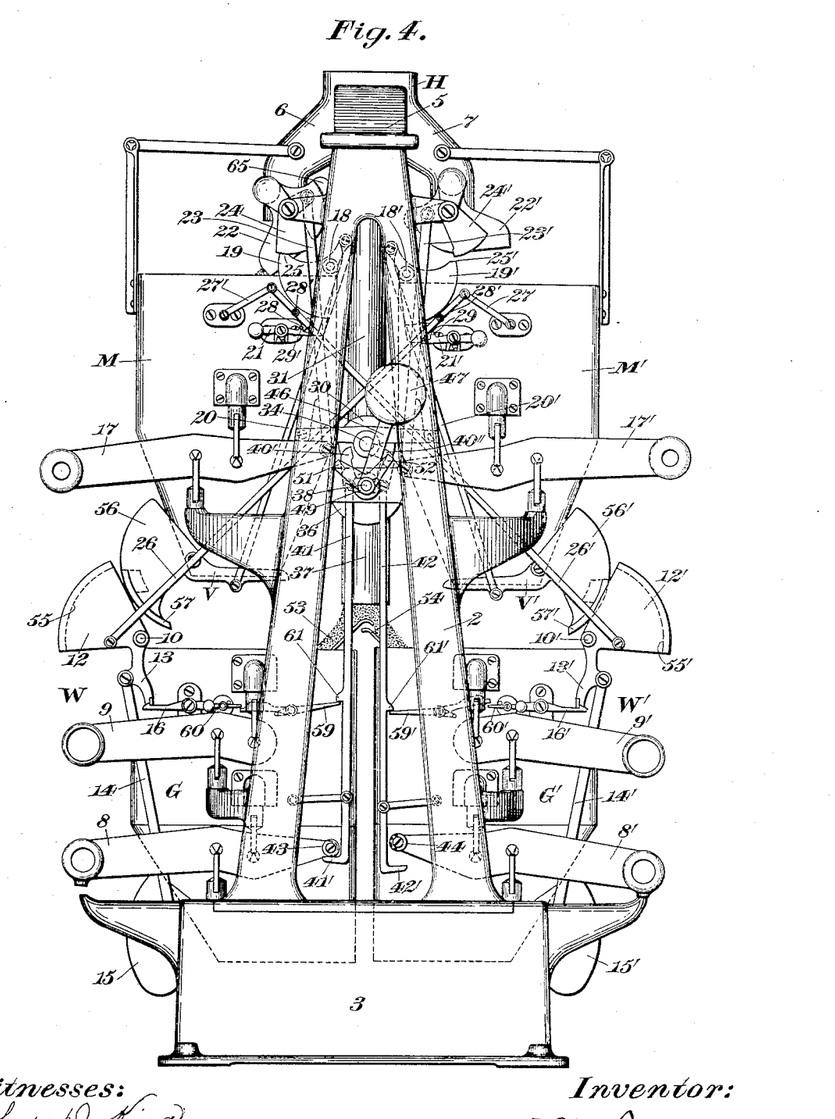

When the charge from the meter-bucket M is received by the weighing-bucket G, the latter, and consequently the beam mechanism, will be caused to descend or settle, and the projection 43 on the beam 8 being in engagement with the hook 41' the rod 41 will be drawn downward and in correspondence with the movement of the weighing mechanism, the yoke 40 being also swung to the left with the shaft 38, so that the spout 37 will be oppositely oscillated, whereby the stream from said spout will be slowly directed toward the bucket G', the weighted arm 46 being concurrently swung in a direction corresponding with the yoke 40 until it occupies its intermediate or mid-stroke position, as indicated in Figs. 4 and 6, said arm being then nearly perpendicular. At this juncture the load will have been nearly completed by the drip-stream. On the completion of the load the beam 8 will be caused to descend farther, drawing the rod 41 down until the weighted arm 46 is caused to cross the perpendicular, at which time said arm quickly drops on or impinges against the shoulder 51' of the arm 51, which action instantly rocks the shaft 38 and swings the spout 37 rapidly to the right or to the position illustrated in Fig. 7, so that the stream from the spout 37 will be delivered into the bucket G', subsequent to which the operation just described will be reversed with respect to the bucket G, as will be understood.

I provide means for modifying or checking the force of impact and momentum of the falling drip-stream, which is particularly advantageous during the poising period. Such means consists in the present instance of two overlapping baffle-plates adjacent to each other and preferably formed integral with the buckets G and G' at the upper sides thereof. Said plates, which are designated by 53 and 54, are acute angular in cross-section, the plate 53 being curved near its upper end to overlap the adjoining curved portion of the plate 54. The stream of material from the spout 37 will be delivered to the inclined portion of the two baffle-plates at an obtuse angle, whereby, as will be obvious, the two specified forces of the gravitating drip-stream will be materially reduced, whereby the tendency of the bucket to pass prematurely below the poising-line will be wholly removed.

In connection with the meter-valve V and the closer L, I employ reciprocally-effective stops adapted for holding one of said first-mentioned members closed while the other is open, and vice versa, the meter-valve V' and the closer L' being similarly equipped.

The rocker 12, to which reference has been hereinbefore made, is operative with the closer L, as has been specified, and serves as one of said stops, it having the segmental inwardly-projecting flange 55.

The closer-valve V has the segmental counterweighted plate 56, which also constitutes a stop, the purpose of the counterweight being to return the closer-valve V to its shut position on the discharge of the contents of the meter M. The plate 56 has the oppositely-projecting curved flange 57.

I have described in detail but one of the stop mechanisms, as they are the same in each instance, similar parts in the other being designated by corresponding characters with prime-marks.

On reference to Fig. 2, where the closer L' is illustrated in its wide-open position, the closer V' being shut, the stop-flange 55' is under and adjacent to the coöperating flange 56'. Should the latch 21' have been tripped too soon, the closer-valve V' may open for a very short distance, or until the flange 55' abuts against the flange 57', the further movement of the closer being thereby arrested or interrupted. When the closer L' has reached its normal position, the flange 55', by the action of said closer in shutting, will pass beyond the plane of movement of the flange 57', so that the closer-valve V' may be opened, it being assumed, of course, that the latch 21' has been tripped.

Referring now to Fig. 3, wherein the closer-valve V is in its wide-open position, the closer L (not shown in said Fig. 3) being shut, the flange 55 will be adjacent to the flange 57, so that should the latch 16 have been tripped and the closer L be opened the stop member and consequently said closer may move for a short distance, or until the flange 55 meets the flange 57, which intercepts or blocks the further movement of the member 12, and consequently prevents the further opening movement of the closer L.

From the foregoing description it will be evident that the valve V and closer L cannot be opened simultaneously, the stop devices just described preventing such action, whereby material might run through the bucket G without being measured or weighed and registered.

A short lever is illustrated at 59, pivotally mounted on the bucket G and resting on a suitable stop thereon, it being adapted to engage a by-pass 60 on the latch 16 on one of its strokes, whereby said latch will be tripped and its catch disengaged from the shoulder on the rocker-arm 13, whereby the closer L will be released. On the opposite stroke of said lever it engages said by-pass 60 and swings it ineffectively about its axis.

A projection is shown at 61 on the rod 41, which, on the final and accelerated movement of said rod on the completion of the bucket-load, is caused to come in contact with the inner arm of the lever 59, thereby elevating the opposite arm of said lever and causing said last-mentioned arm to engage under the by-pass, which at this time is suitably held against movement and constitutes in effect a fixed extension of the latch, so that the latch will be tripped as described, as is clearly apparent from the drawings.

The rod 42 is furnished with a projection

61', which coöperates with a lever 59' on the bucket G' and by-pass 60' on the latch 16' in a manner similar to the parts just described.

The operation of the hereinbefore-described weighing apparatus is as follows: Fig. 2 represents the meter M as containing a measured charge, the valve 22, which controls the supply of material thereto, and the closer-valve V both being shut, the closer-valve V' being also shut and the supply-controlling valve 22' being wide open to direct a stream of material into the meter-bucket M'. The closer L' is open, the contents of the bucket G' consequently being discharged. On the shutting of the closer L' the rod 26' will be drawn downward until the latch-tripping dog 28' thereof meets the pin 29' on the latch 21, and on the continuation of the movement of said rod the latch 21 will be tripped and disengaged from the arm of the rocker 19, whereby the closer-valve V will be released and forced open by the mass of material within the meter M, the material being delivered into the weighing-bucket G. During the period of operation just described the spout 27 has been delivering a stream of material to the bucket G, so that when the metered charge is received by the latter it and the beam mechanism will descend, and the projection 43 of the beam 8 being in contact with the hook 41' of the rod 41 said rod will be drawn downward, the drip-spout 37 being slowly oscillated to the right in the manner previously described, said spout being subsequently given an accelerated movement by the dropping of the counterweighted arm 46, which impinges against the shoulder 51' of the arm 51, the rod 41 also being thrust downward until the projection 61 engages the latch-tripping lever 59, the latter being rocked and caused to engage the by-pass 60 on the free end of the latch 16, thereby disengaging the hook of the latter from the rocker-arm 13, so that the closer L will be released.

Having described my invention, I claim—

1. The combination with weighing mechanism embodying a load-receiver, of main supply means for said load-receiver; a force-feeder; a device communicating with said feeder and serving to direct a continuously-running drip-stream to said load-receiver; and connections between said device and the weighing mechanism.

2. The combination with a plurality of weighing mechanisms, each embodying a load-receiver, and with main supply means for said load-receivers; of means controlled by said weighing mechanisms for alternately directing a continuously-running drip-stream to said load-receivers.

3. The combination with weighing mechanism embodying a load-receiver, of a meter and its supply mechanism; instrumentalities for effecting the discharge of said meter, whereby its contents are delivered to said load-receiver to constitute the major part of a load to be weighed thereby; means for directing a continuously-running drip-stream to said load-receiver; and devices connecting said last-named means with the weighing mechanism.

4. The combination with weighing mechanism embodying a load-receiver, of main supply means therefor; means for maintaining a continuously-running drip-stream; a movable spout located to direct said drip-stream toward and from the load-receiver; and actuating mechanism for said spout controlled by the weighing mechanism.

5. The combination with weighing mechanism embodying a load-receiver, of main supply means therefor; means for maintaining a continuously-running drip-stream; a movable spout located to direct said drip-stream toward and from the load-receiver; and actuating mechanism for said spout, controlled by the weighing mechanism.

6. The combination with weighing mechanism embodying a load-receiver, of main supply means therefor; means for maintaining a continuously-running drip-stream; an oscillatory spout located to direct said drip-stream toward and from a load-receiver; and means for imparting differential oscillatory movements to said spout.

7. The combination with a plurality of weighing mechanisms, each embodying a load-receiver; of means for maintaining a continuously-running stream of material; a movable spout located to alternately deliver said stream to the load-receivers; and means controlled by the weighing mechanisms for imparting movements of variable speeds to said spout.

8. The combination with weighing mechanism including a load-receiver; of main supply means therefor; instrumentalities for supplying a drip-stream to said load-receiver; and an inclined baffle-plate located relatively to the bucket and adapted to receive the impact of the drip-stream to check the momentum thereof.

9. The combination of a plurality of weighing mechanisms, each embodying a load-receiver; of main supply means for said load-receivers; instrumentalities for alternately delivering a drip-stream to said load-receivers; and inclined baffle-plates located relatively to the load-receivers, one of which overlaps the other, said baffle-plates being adapted to receive the impact of said drip-stream to check the momentum thereof.

10. The combination with weighing mechanism including a load-receiver having an inclined baffle-plate, of main supply means for said load-receiver; and means for maintaining and for directing a continuously-running drip-stream to said load-receiver, the impact of said drip-stream being received by the baffle-plate to check its momentum.

11. The combination with a bucket having at its upper side an acute angular baffle-plate formed integral therewith, of main supply means for said bucket; and instrumentalities and means including a latch for holding said closer against movement; of a lever located to engage said latch; an oscillatory spout adapted to deliver a stream of material to said bucket; a supporting-shaft for said spout; a yoke on said shaft, having a rod connected thereto which is provided with a projection, said yoke having shouldered arms; a sleeve loose on said shaft, provided with a counterweighted arm and also having shouldered arms which are alternately engaged by the arms of the yoke; and a second sleeve on said shaft, having shouldered arms which are alternately engaged by said counterweighted arms.

FRANCIS H. RICHARDS.

Witnesses:
FRED. J. DOLE,
GEO. A. HOFFMAN.